United States Patent
Yuen et al.

(10) Patent No.: US 11,434,854 B2
(45) Date of Patent: Sep. 6, 2022

(54) AIR FILTER SYSTEM FOR A UTILITY VEHICLE

(71) Applicant: DEERE & COMPANY, Moline, IL (US)

(72) Inventors: Ming Parker Yuen, Heidelberg (DE); Phouphadeth Sananikone, Ludwigshafen (DE); Axel Förster, Hochdorf-Assenheim (DE); Alexander Berg, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/141,932

(22) Filed: Jan. 5, 2021

(65) Prior Publication Data

US 2021/0231085 A1    Jul. 29, 2021

(30) Foreign Application Priority Data

Jan. 27, 2020  (DE) .......................... 102020200945.7

(51) Int. Cl.
| | |
|---|---|
| *B01D 59/50* | (2006.01) |
| *F02M 35/024* | (2006.01) |
| *B01D 50/20* | (2022.01) |
| *B01D 45/12* | (2006.01) |
| *B01D 46/62* | (2022.01) |
| *B01D 46/71* | (2022.01) |
| *F02M 35/16* | (2006.01) |
| *B01D 46/64* | (2022.01) |

(Continued)

(52) U.S. Cl.
CPC ....... F02M 35/02458 (2013.01); B01D 50/20 (2022.01); F02M 35/0245 (2013.01); *B01D 45/12* (2013.01); *B01D 46/62* (2022.01); *B01D 46/64* (2022.01); *B01D 46/71* (2022.01); *F02M 35/0216* (2013.01); *F02M 35/086* (2013.01); *F02M 35/164* (2013.01)

(58) Field of Classification Search
CPC ......... F02M 35/02458; F02M 35/0245; F02M 35/0216; F02M 35/0223; F02M 35/164; F02M 35/086; B01D 50/20; B01D 45/12; B01D 46/62; B01D 46/71; B01D 46/64
See application file for complete search history.

(56) References Cited

U.S. PATENT DOCUMENTS 3,672,130 A * 6/1972 Sullivan ............... F02M 35/022
                                                   55/330
3,756,416 A * 9/1973 Wood ..................... B01D 46/10
                                                   55/293

(Continued)

FOREIGN PATENT DOCUMENTS

| DE | 102018131832 A1 | 6/2019 |
| DE | 102019003209 A1 | 11/2020 |

OTHER PUBLICATIONS

European Search Report issued in European Patent Application No. 20215070.2, dated Apr. 22, 2021, 6 pages.

*Primary Examiner* — Dung H Bui

(57) ABSTRACT

An air filter system for a utility vehicle includes a filter housing, a coarse filter located on an inlet side and accommodated in the filter housing, a fine filter arranged downstream in a filter operating direction of an airflow to be cleaned, and a cleaning arrangement accommodated in the filter housing for purging dirt particles separated at least in the fine filter counter to the filter operating direction.

20 Claims, 3 Drawing Sheets

(51) Int. Cl.
    *F02M 35/02*     (2006.01)
    *F02M 35/08*     (2006.01)

(56) References Cited

U.S. PATENT DOCUMENTS

| | | | |
|---|---|---|---|
| 5,930,994 A * | 8/1999 | Shimato | F01N 3/031 |
| | | | 60/311 |
| 9,023,135 B1 * | 5/2015 | Elliott | B01D 46/48 |
| | | | 55/303 |
| 9,273,648 B2 * | 3/2016 | Link | F02M 35/086 |
| 9,273,649 B2 * | 3/2016 | Gomez | F02M 35/086 |
| 9,463,812 B2 | 10/2016 | Govindappa et al. | |
| 10,507,419 B2 | 12/2019 | Holzmann et al. | |
| 2003/0217534 A1 * | 11/2003 | Krisko | B01D 50/20 |
| | | | 55/482 |
| 2008/0016832 A1 * | 1/2008 | Krisko | B01D 46/4227 |
| | | | 55/342 |
| 2009/0113856 A1 * | 5/2009 | Cooper | E01H 1/053 |
| | | | 55/283 |
| 2011/0197556 A1 * | 8/2011 | Brown | F02M 35/0245 |
| | | | 55/498 |
| 2015/0176545 A1 | 6/2015 | Troxell et al. | |
| 2017/0096971 A1 * | 4/2017 | Kaufmann | B01D 50/20 |
| 2019/0176075 A1 * | 6/2019 | Hoff | F02M 35/024 |
| 2019/0195179 A1 * | 6/2019 | Hoff | B60K 11/08 |
| 2019/0247778 A1 * | 8/2019 | Handte | B01D 46/52 |
| 2020/0355145 A1 * | 11/2020 | Yuen | B01D 45/14 |
| 2020/0406182 A1 * | 12/2020 | Grieve | B01D 46/71 |
| 2021/0017939 A1 * | 1/2021 | Koeger | B01D 46/2411 |
| 2021/0138397 A1 * | 5/2021 | Schulz-Sciberras | B01D 53/38 |
| 2021/0340939 A1 * | 11/2021 | Sheidler | B01D 46/71 |

\* cited by examiner

AIR FILTER SYSTEM FOR A UTILITY VEHICLE

RELATED APPLICATIONS

This application claims priority to German Application No. 102020200945.7, filed Jan. 27, 2020, the disclosure of which is hereby expressly incorporated by reference in its entirety.

FIELD OF THE DISCLOSURE

The present disclosure relates to an air filter system for a utility vehicle having a coarse filter on the inlet side, which is accommodated in a filter housing, as well as a fine filter which is arranged downstream in the filter operating direction of an airflow to be cleaned.

BACKGROUND

A conventional air filter system for an all-terrain utility vehicle provided with a turbocharged diesel engine is disclosed, for example, in DE 10 2019 003 209 A1 in which a coarse filter is provided for pre-cleaning charge air to be compressed by a turbocharger as well as a downstream (multistage) fine filter for removing residual contaminants. The coarse filter and the fine filter are accommodated in a common filter housing, wherein the filter housing may be opened from the outside and the fine filter may be removed by hand for the purpose of cleaning. Carrying out the cleaning process is also relatively complicated or time-consuming, in particular, due to the fact that easy access to the filter housing is generally not available due to the restricted space conditions in the engine compartment.

Thus, there is a need for an improved air filter system for carrying out a cleaning process.

SUMMARY

According to the present disclosure, the air filter system for a utility vehicle includes a coarse filter on the inlet side, which is accommodated in a filter housing, as well as a fine filter arranged downstream in the filter operating direction of an airflow to be cleaned, wherein a cleaning arrangement accommodated in the filter housing is present for purging dirt particles separated at least in the fine filter counter to the filter operating direction.

In this case, due to the air pressure created by the cleaning arrangement during the purging process, at least a portion of the separated dirt particles may be conveyed from the filter surface of the fine filter in the direction of the coarse filter and therefrom into the surroundings. This enables the fine filter to be cleaned in a rapid and simple manner without having to dismantle the filter housing. The cleaning process which is carried out in such a manner may take place, in particular, immediately after starting up the utility vehicle before starting the actual driving operation so that it does not lead to any significant stoppage times or interruptions in the course of subsequent operation.

The cleaning arrangement has an air outlet nozzle which is oriented in the direction of a filter surface of the fine filter and which is able to be supplied by a pressurized air source. The geometric properties of the air outlet nozzle are selected such that this air outlet nozzle permits the application of a two-dimensional cleaning air stream in the direction of the filter surface. The pressurized air source may be, in particular, a component of a pneumatic system of the utility vehicle.

In order to improve further the two-dimensional action of the cleaning air stream, there is the possibility that the cleaning arrangement has a plurality of air outlet nozzles which are arranged so as to be distributed over the filter surface. The spatial arrangement thereof may be adapted, in particular, to the path of the filter surface.

The coarse filter may be a centrifugal air filter for pre-cleaning air which is suctioned from the surroundings. Generally, the centrifugal air filter comprises a plurality of individual separators which displace an airflow passing through into a defined swirling motion so that, due to the generated centrifugal forces, coarse particles contained in the airflow are spun into a collecting region surrounding the individual separators. A connecting piece provided on the filter housing feeds into the collecting region, via which the coarse particles located in the separating region may be suctioned outwardly by a vacuum being generated relative to the surroundings.

The fine filter typically has a folded or pleated filter fabric which is accommodated in a cartridge insert for increasing the effective filter surface. The cartridge insert may be removed by hand by opening the filter housing and, if required, replaced with a new cartridge insert. This is required, among other things, when the filter fabric is contaminated with dirt particles such that a sufficient cleaning action is no longer able to be achieved by the cleaning arrangement. When this occurs, it is dictated by, among other things, the type of dirt particles and the surrounding conditions, in particular the air humidity. For removing the fine filter or the associated cartridge insert it is conceivable that the filter housing is of multipart construction and may be dismantled if required.

Moreover, a safety filter may be redundantly arranged downstream of the fine filter inside the filter housing in the filter operating direction. This prevents dirt particles, which are potentially released into the filter housing when the fine filter is removed, from being suctioned into components arranged downstream and possibly damaging these components when the filter operation is restarted. The safety filter is also ultimately a fine filter which, however, is fixedly mounted inside the filter housing.

The air outlet nozzle may feed into a housing chamber region which is configured between the fine filter and the safety filter in the direction of the filter surface of the fine filter. The cleaning process, which may be carried out by the application of a cleaning air stream, is limited in this case exclusively to the fine filter and optionally the coarse filter. This takes into account the fact that in the case of enhanced cleaning requirements a cleaning of the safety filter is undesired due to the possibility of undetected damage or leakages which might have been caused.

In this case it is possible that the air outlet nozzle extends through the safety filter into the housing chamber region. In particular, the air outlet nozzle may be structurally integrated in the safety filter. To this end, the safety filter has a plastics housing with a through-opening for receiving the air outlet nozzle in a sealed manner. In this case the accommodation of the cleaning arrangement or air outlet nozzle inside the filter housing is possible in a particularly space-saving manner since the housing chamber region does not have to receive the entire air outlet nozzle, including an associated compressed air line for the supply of pressurized air, and thus may be correspondingly compact.

For the sake of completeness, it should be mentioned that a further fine filter, which may also be purged by the cleaning arrangement accommodated in the filter housing, may also be provided instead of a safety filter. This further fine filter may be accommodated in a separate cartridge insert inside the filter housing and may also have a folded or pleated filter fabric. In this case, the air outlet nozzle is located in a housing chamber region mounted downstream of the further fine filter.

In the simplest case, the cleaning process may be triggered manually by actuating a pressurized air source supplying the cleaning arrangement. In order to indicate to the driver the need to carry out the cleaning process, it is conceivable that a monitoring unit activates a driver information unit as a function of data of a timing control or a filter state detection in order to output a corresponding driver instruction. Additionally or alternatively, the pressurized air source is automatically actuated by the monitoring unit on the basis of this data.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
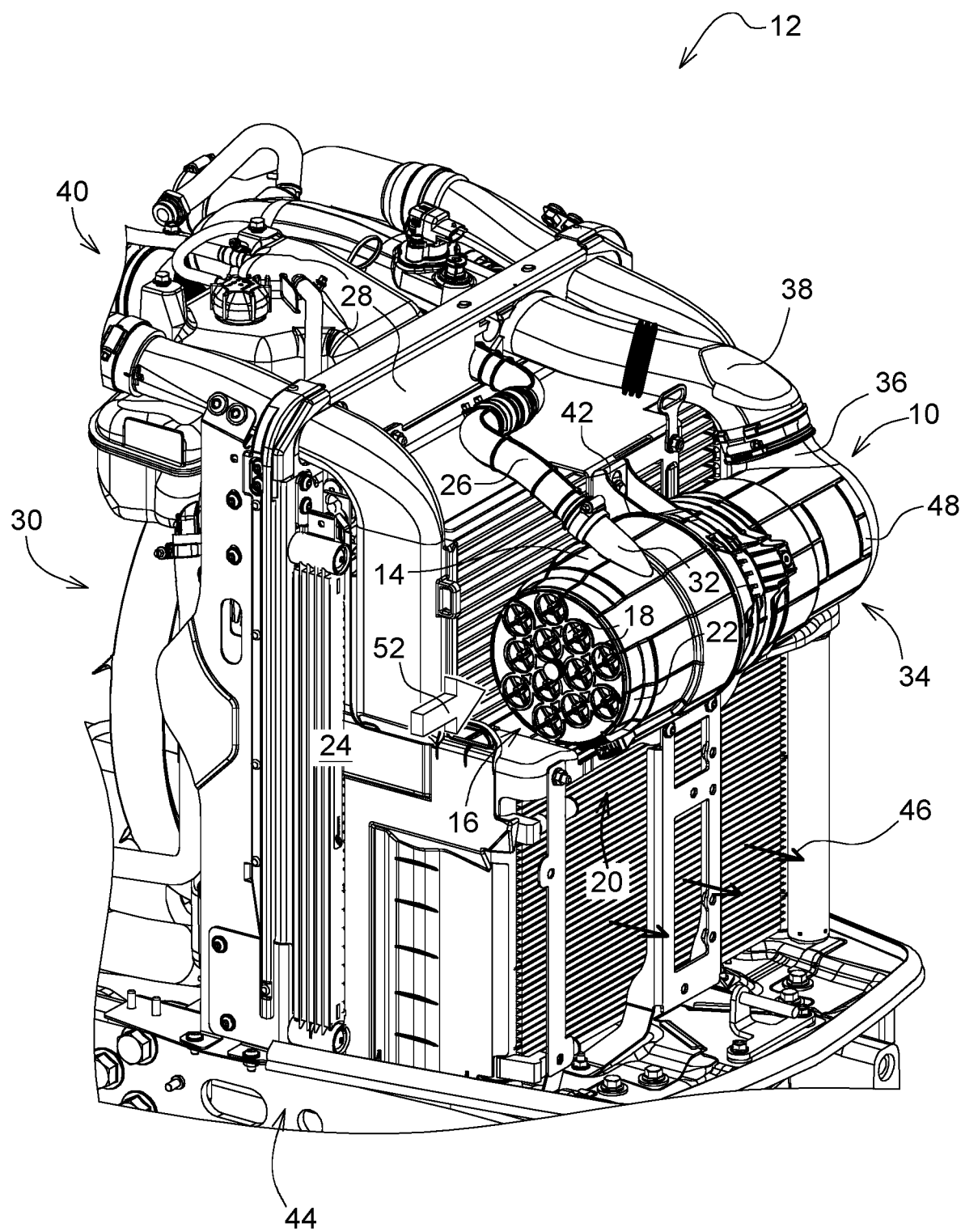
FIG. 1 shows an overall view of the air filter system according to the disclosure in an engine compartment of a utility vehicle configured as an agricultural tractor.

FIG. 1 shows an overall view of an air filter system 10 in an engine compartment 12 of a utility vehicle (not illustrated) which is configured as an agricultural tractor. The fact that the utility vehicle is an agricultural tractor in this case is merely by way of example and it may equally be a utility vehicle of any other design from the agricultural, forestry or construction vehicle field.

The air filter system 10 comprises a filter housing 14 which is produced as a plastics injection-molded part with a plurality of air inlet openings 16 arranged on the front face. One respective individual separator 18 of a coarse filter 22 configured as a centrifugal air filter 20 adjoins each of the air inlet openings 16 for pre-cleaning air suctioned from the surroundings 24. A connecting piece 32, which is connected via an air hose 26 to a fan shroud 28 of a main cooling system 30 on the vacuum side, serves for suctioning separated coarse particles by generating a vacuum relative to the surroundings 24. Further details relative to the construction of the centrifugal air filter 20 are described in connection with FIG. 2 or FIG. 4.

As may be identified further in FIG. 1, located in a housing region 34 remote from the air inlet openings 16 is a lateral air outlet connector 36, the airflow cleaned by the air filter system 10 being supplied therefrom to a turbocharger of a diesel engine 40 via a further air hose 38.

By way of example, the filter housing 14 is fastened inside the engine compartment 12 by a mounting flange 42 which is accessible from the front in an upper region of a cooler unit 44, a cool airflow 46 generated by the main cooling system 30 passing therethrough. The filter housing 14 is of multipart construction and, if required, may be dismantled for the purposes of cleaning.

Figure 2:
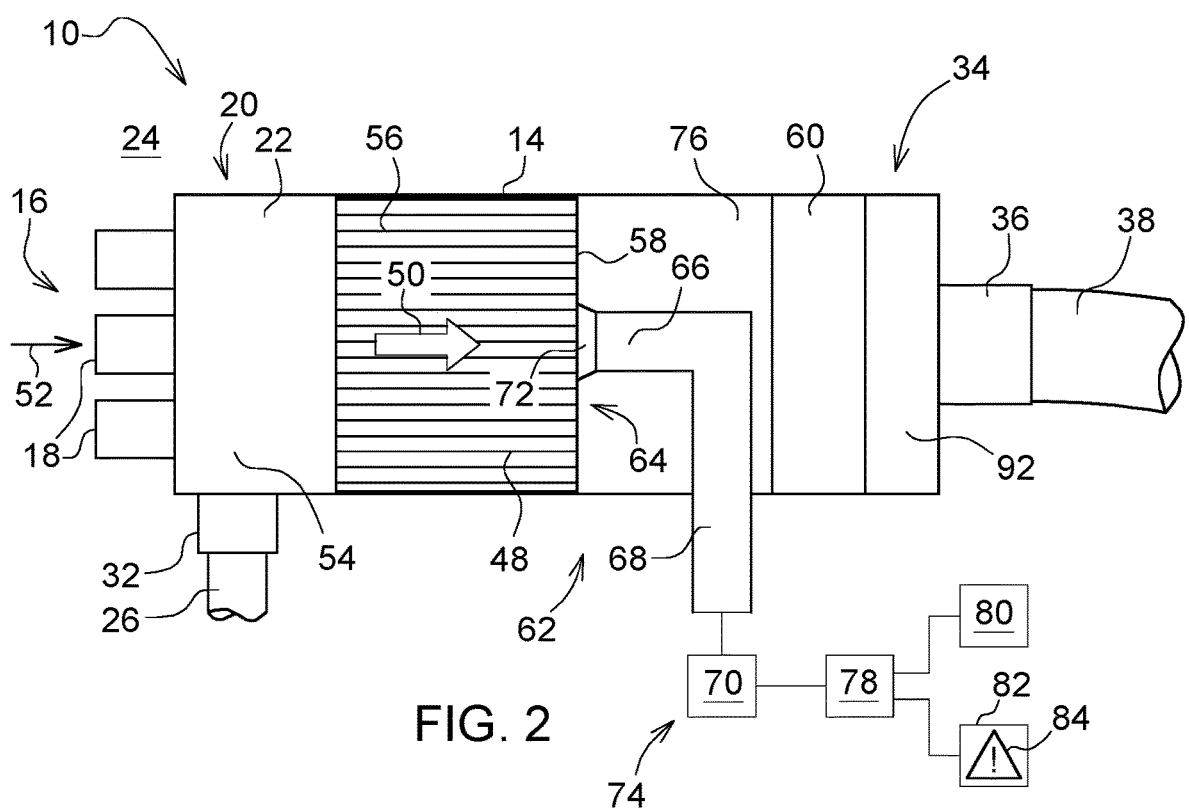
FIG. 2 shows a schematic sectional view of a first embodiment of the air filter system in FIG. 1.

FIG. 2 shows a schematic sectional view of a first embodiment of the air filter system 10 in FIG. 1. Accordingly, the air filter system 10 comprises, in addition to the centrifugal air filter 20 on the inlet side, a fine filter 48 which is also accommodated in the filter housing 14 and which is arranged downstream of the centrifugal air filter 20 in the filter operating direction 50 of the airflow 52 to be cleaned.

Each of the individual separators 18 of the centrifugal air filter 20 displaces the airflow 52 passing through into a defined swirling motion so that, due to the generated centrifugal forces, coarse particles contained in the airflow 52 are spun into a collecting region 54 surrounding the individual separators 18 and are suctioned outwardly therefrom via the connecting piece 32 and conveyed into the surroundings 24.

For increasing the effective filter surface the fine filter 48 has a folded or pleated filter fabric 56 which is accommodated in a cartridge insert 58. The cartridge insert 58 may be removed by hand by opening the filter housing 14 and, if required, replaced with a new insert.

Moreover, inside the filter housing 14 in the filter operating direction 50 a safety filter 60 is redundantly arranged downstream of the fine filter 48. The safety filter 60 prevents dirt particles, which are potentially released into the filter housing 14 when the fine filter 48 is removed, from being suctioned into components arranged downstream and potentially damaging these components when the filter operation is restarted.

A cleaning arrangement 62 accommodated in the filter housing 14 permits dirt particles separated in the fine filter 48 to be purged counter to the filter operating direction 50. The cleaning arrangement 62 has an air outlet nozzle 66 which is oriented in the direction of a filter surface 64 of the fine filter 48 and which is able to be supplied with compressed air via an associated supply line 68 from a pressurized air source 70. The geometric properties of the air outlet nozzle 66 are selected such that they permit the application of a two-dimensional cleaning air stream 72 in the direction of the filter surface 64. The pressurized air source 70 is a component of a pneumatic system 74 of the agricultural tractor.

The air outlet nozzle 66 feeds into a housing chamber region 76 which is configured between the fine filter 48 and the safety filter 60 in the direction of the filter surface 64 of the fine filter 48. The cleaning process which may be carried out by the application of the cleaning air stream 72 is limited in this case exclusively to the fine filter 48. This takes into account the fact that in the case of enhanced cleaning requirements a cleaning of the safety filter 60 is undesired due to the possibility of undetected damage or leakages which might have been caused.

In the simplest case, the cleaning process is triggered manually by actuating the pressurized air source 70 supplying the cleaning arrangement 62 via a control element 80 connected to a monitoring unit 78. In order to indicate to the driver the need to carry out the cleaning process, the monitoring unit 78 activates a driver information unit 82 as a function of data of a timing control or a filter state detection in order to output a corresponding driver instruction 84. Additionally or alternatively, the pressurized air source 70 is automatically actuated by the monitoring unit 78 on the basis of this data.

As a result, by the actuation of the pressurized air source 70 at least a portion of the dirt particles are conveyed from the filter surface 64 of the fine filter 48 in the direction of the coarse filter 22, due to the air pressure created by the cleaning arrangement 62 during the purging process, and therefrom into the surroundings 24. This enables the fine filter 48 to be cleaned in a rapid and simple manner without having to dismantle the filter housing 14. The cleaning process carried out in such a manner takes place, in particular, immediately after starting up the agricultural tractor before starting the actual driving operation so that it does not lead to any significant stoppage times or interruptions in the course of subsequent operation.

Figure 3:
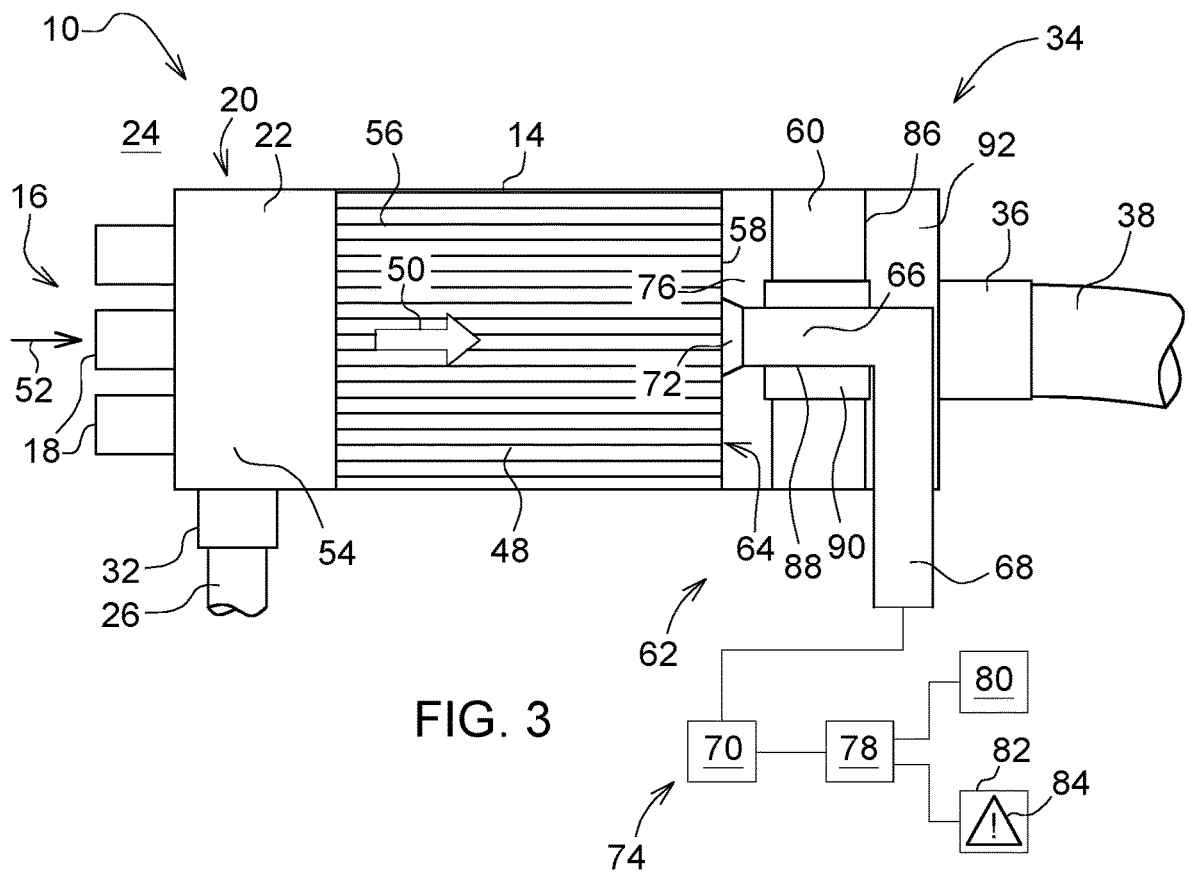
FIG. 3 shows a schematic sectional view of a second embodiment of the air filter system in FIG. 1.

FIG. 3 shows a schematic sectional view of a second embodiment of the air filter system 10 in FIG. 1. In contrast to the first embodiment, the air outlet nozzle 66 in the present case is not configured as a separate component but instead extends through the safety filter 60 into the housing chamber region 76 in order to feed into said housing chamber region in the direction of the filter surface 64 of the fine filter 48. The air outlet nozzle 66 in this case is structurally integrated in the safety filter 60. To this end, the safety filter 60 has a plastics housing 86 with a through-opening 88 for receiving the air outlet nozzle 66 in a sealed manner. In this case, the accommodation of the cleaning arrangement 62 or air outlet nozzle 66 inside the filter housing 14 is possible in a particularly space-saving manner since the housing chamber region 76 does not have to receive the entire air outlet nozzle 66, including the associated supply line 68 for the supply of pressurized air, and thus may be correspondingly compact.

In FIGS. 2 and 3, for reasons of illustration in each case, the air outlet connector 36 is arranged at the front end of the housing region 34. In practice, however, this air outlet connector is located on the side of the housing region 34 due to the transversely running installed position of the air filter system 10 corresponding to FIG. 1.

Figure 4:
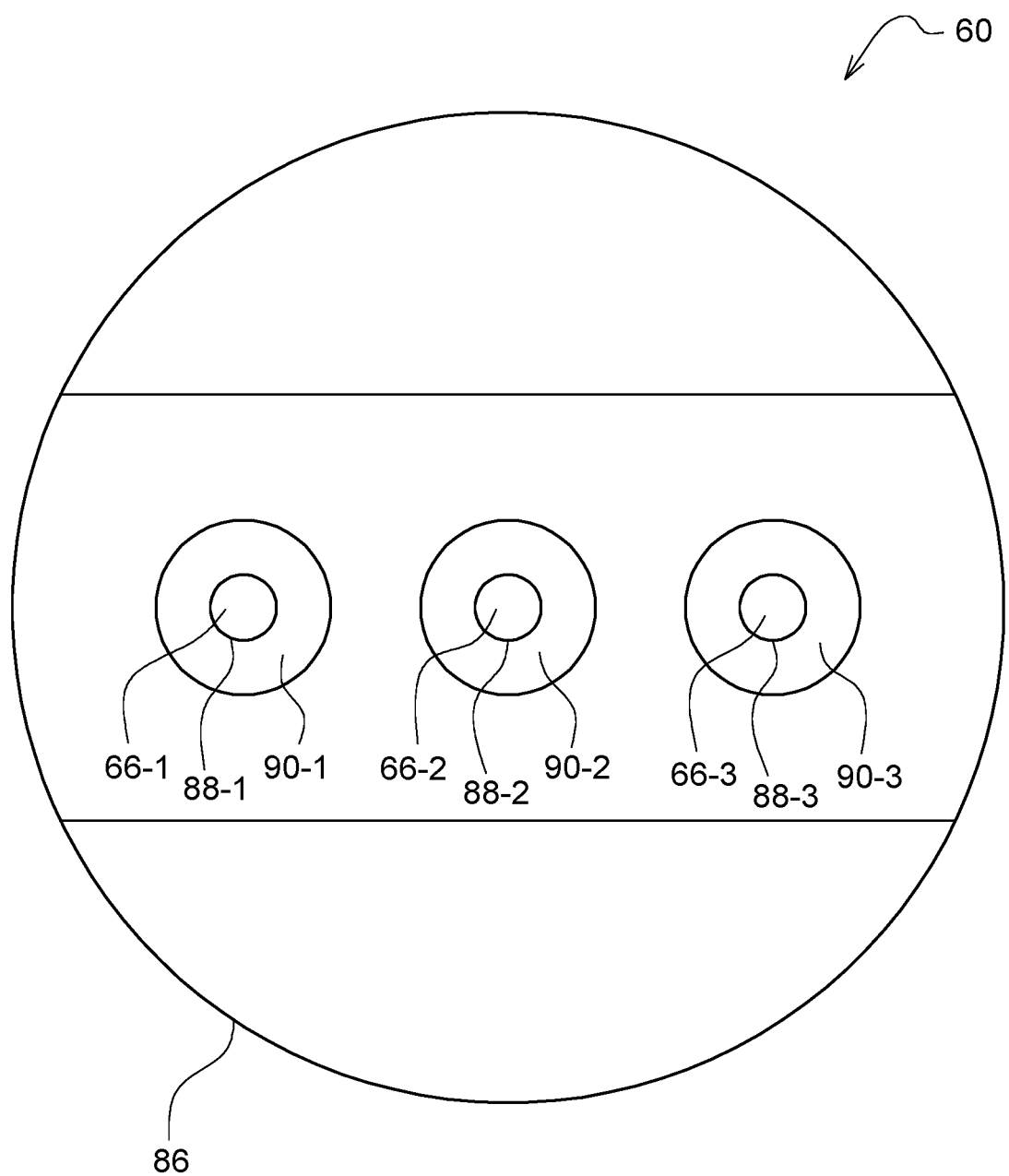
FIG. 4 shows a plan view of a cleaning arrangement encompassed by the air filter system according to FIG. 3 with a plurality of air outlet nozzles.

In order to improve further the two-dimensional effect of the cleaning air stream 72, corresponding to the development illustrated in FIG. 4, the cleaning arrangement 62 does not have just one but has a plurality of air outlet nozzles 66-1, 66-2, 66-3 which are arranged so as to be distributed over the filter surface 64. The spatial arrangement thereof in this case is adapted to the path (or the topography) of the filter surface 64. Each of the air outlet nozzles 66-1, 66-2, 66-3 is received in a separate through-opening 88-1, 88-2, 88-3 in the plastics housing 86 of the safety filter 60 and mounted or sealed therein by a rubber ring 90-1, 90-2, 90-3. Apart from the arrangement of three air outlet nozzles 66-1, 66-2, 66-3 adjacent to one another, shown by way of example, any other number may also be provided, wherein these air outlet nozzles may also be arranged in any other formation, for example, in a star-shaped or circular manner.

For the sake of completeness, it should be mentioned that in the case of the embodiments described above a further fine filter, which may also be purged by the cleaning arrangement 62 accommodated in the filter housing 14, may also be provided instead of a safety filter 60. This further fine filter may be accommodated in a separate cartridge insert inside the filter housing 14 and may also have a folded or pleated filter fabric. In this case, the air outlet nozzle 66 is located in a housing chamber region 92 mounted downstream of the further fine filter.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An air filter system for a utility vehicle, comprising:
a filter housing;
a coarse filter on an inlet side and accommodated in the filter housing;
a fine filter arranged downstream in a filter operating direction of an airflow to be cleaned;
a cleaning arrangement accommodated in the filter housing for purging dirt particles separated at least in the fine filter counter to the filter operating direction;
a safety filter redundantly arranged downstream of the fine filter inside the filter housing in the filter operating direction; and
an air outlet nozzle oriented in a direction of a filter surface of the fine filter, wherein the air outlet nozzle feeds into a housing chamber region located between the fine filter and the safety filter in the direction of the filter surface, and wherein the air outlet nozzle extends through the safety filter into the housing chamber region.

2. The air filter system of claim 1, further comprising a pressurized air source for supplying pressurized air to the air outlet nozzle.

3. The air filter system of claim 1, wherein the cleaning arrangement comprises a plurality of air outlet nozzles arranged so as to be distributed over the filter surface.

4. The air filter system of claim 1, wherein the coarse filter comprises a centrifugal air filter for pre-cleaning air suctioned from its surroundings.

5. The air filter system of claim 1, wherein the fine filter comprises a folded filter fabric accommodated in a cartridge insert for increasing an effective filter surface.

6. The air filter system of claim 1, wherein the pressurized air source is automatically actuated by a monitoring unit based on a timing control.

7. The air filter system of claim 1, wherein the pressurized air source is automatically actuated by a monitoring unit based on a filter state detection.

8. The air filter system of claim 1, wherein the pressurized air source is actuated after starting up the utility vehicle and before a driving operation.

9. A utility vehicle, comprising:
an engine compartment; and
air filter system disposed within the engine compartment, the air filter system comprising:
a filter housing;
a coarse filter on an inlet side and accommodated in the filter housing;
a fine filter arranged downstream in a filter operating direction of an airflow to be cleaned;
a cleaning arrangement accommodated in the filter housing for purging dirt particles separated at least in the fine filter counter to the filter operating direction;

a safety filter redundantly arranged downstream of the fine filter inside the filter housing in the filter operating direction; and an air outlet nozzle oriented in a direction of a filter surface of the fine filter, wherein the air outlet nozzle feeds into a housing chamber region located between the fine filter and the safety filter in the direction of the filter surface, and wherein the air outlet nozzle extends through the safety filter into the housing chamber region.

10. The utility vehicle of claim 9, further comprising a pressurized air source for supplying pressurized air to the air outlet nozzle.

11. The utility vehicle of claim 9, wherein the cleaning arrangement comprises a plurality of air outlet nozzles arranged so as to be distributed over the filter surface.

12. The utility vehicle of claim 9, wherein the coarse filter comprises a centrifugal air filter for pre-cleaning air suctioned from its surroundings.

13. The utility vehicle of claim 9, wherein the fine filter comprises a folded filter fabric accommodated in a cartridge insert for increasing an effective filter surface.

14. The utility vehicle of claim 9, wherein the pressurized air source is automatically actuated by a monitoring unit based on a timing control.

15. The utility vehicle of claim 9, wherein the pressurized air source is automatically actuated by a monitoring unit based on a filter state detection.

16. The utility vehicle of claim 9, wherein the pressurized air source is actuated after starting up the utility vehicle and before a driving operation.

17. A filter system for a utility vehicle, comprising:
a filter housing;
a coarse filter located on an inlet side and accommodated in the filter housing, the coarse filter comprises a centrifugal air filter for pre-cleaning air suctioned from its surroundings;
a fine filter comprising a filter surface, the fine filter being arranged downstream in a filter operating direction of an airflow to be cleaned;
a cleaning arrangement accommodated in the filter housing for purging dirt particles separated at least in the fine filter counter to the filter operating direction, the cleaning arrangement comprising an air outlet nozzle oriented in a direction of the filter surface;
a pressurized air source for supplying pressurized air to the air outlet nozzle; and
a safety filter arranged downstream of the fine filter and located inside the filter housing in the filter operating direction;
wherein the air outlet nozzle feeds into a housing chamber region located between the fine filter and the safety filter in the direction of the filter surface;
wherein the air outlet nozzle extends through the safety filter into the housing chamber region.

18. The filter system of claim 17, wherein the pressurized air source is automatically actuated by a monitoring unit based on a timing control.

19. The filter system of claim 17, wherein the pressurized air source is automatically actuated by a monitoring unit based on a filter state detection.

20. The filter system of claim 17, wherein the pressurized air source is actuated after starting up the utility vehicle and before a driving operation.

* * * * *